United States Patent
Decressat et al.

(10) Patent No.: US 9,556,694 B2
(45) Date of Patent: Jan. 31, 2017

(54) APPARATUS AND METHOD FOR A MOTORLESS SEISMIC TOOL

(71) Applicant: Sercel, Carquefou (FR)

(72) Inventors: Jerome Decressat, Puteaux (FR); Jean-Eric Negre, Verriéres le Buisso (FR)

(73) Assignee: SERCEL, Carquefou (FR)

( * ) Notice: Subject to any disclaimer, the term of this patent is extended or adjusted under 35 U.S.C. 154(b) by 83 days.

(21) Appl. No.: 14/329,128

(22) Filed: Jul. 11, 2014

(65) Prior Publication Data
US 2016/0010409 A1    Jan. 14, 2016

(51) Int. Cl.
| E21B 17/10 | (2006.01) |
| E21B 23/01 | (2006.01) |
| G01V 1/00 | (2006.01) |
| E21B 17/00 | (2006.01) |
| E21B 23/00 | (2006.01) |

(52) U.S. Cl.
CPC ............... *E21B 23/01* (2013.01); *G01V 1/005* (2013.01)

(58) Field of Classification Search
CPC ........ E21B 23/01; E21B 23/002; E21B 23/14; E21B 4/18; E21B 17/1057; E21B 17/1014; G01V 1/005; G01V 2001/204
USPC ........ 181/105, 112, 122; 166/382, 211, 214, 166/215, 241.1, 381, 254.2, 206
See application file for complete search history.

(56) References Cited

U.S. PATENT DOCUMENTS

| 1,258,834 | A | | 3/1918 | Waitz | |
| 2,428,168 | A | | 9/1947 | Loper | |
| 2,490,350 | A | * | 12/1949 | Grable | E21B 17/1021 166/193 |
| 3,052,297 | A | * | 9/1962 | Blydorp | E21B 33/134 166/136 |
| 3,064,737 | A | * | 11/1962 | Quinn | E21B 23/02 166/214 |
| 3,371,741 | A | | 3/1968 | Haxby | |
| 3,664,416 | A | * | 5/1972 | Nicolas | G01V 11/005 166/212 |
| 4,616,703 | A | * | 10/1986 | Laurent | E21B 23/01 166/214 |
| 4,957,162 | A | * | 9/1990 | Etourmy | E21B 23/04 166/212 |
| 5,979,550 | A | * | 11/1999 | Tessier | E21B 23/04 166/206 |
| 6,170,601 | B1 | | 1/2001 | Nakajima et al. | |
| 7,331,386 | B2 | * | 2/2008 | Kanayama | E21B 23/01 166/206 |
| 9,217,305 | B2 | * | 12/2015 | Coles | E21B 23/01 |
| 2004/0011533 | A1 | * | 1/2004 | Lawrence | E21B 23/01 166/382 |
| 2012/0006109 | A1 | | 1/2012 | Andersen et al. | |
| 2013/0299188 | A1 | | 11/2013 | Ahmed et al. | |

OTHER PUBLICATIONS

International Search Report and Written Opinion in corresponding International Application No. PCT/EP2015/064603 mailed Sep. 29, 2015.

* cited by examiner

*Primary Examiner* — Edgardo San Martin
(74) *Attorney, Agent, or Firm* — Patent Portfolio Builders PLLC

(57) ABSTRACT

Method and apparatus for collecting data. The apparatus for a motorless seismic tool includes a body; a motorless clamping mechanism connected to the body; and an anchoring arm attached to the body and the motorless clamping mechanism. The motorless clamping mechanism is configured to close or open the anchoring arm based on gravity.

13 Claims, 12 Drawing Sheets

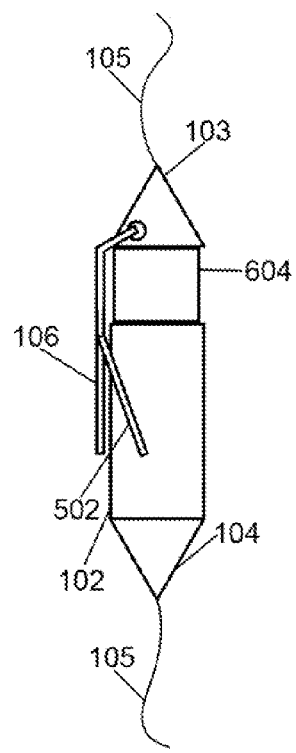 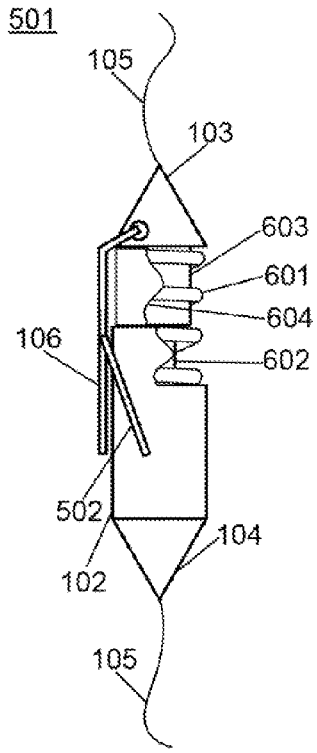
FIG. 9a  FIG. 9b
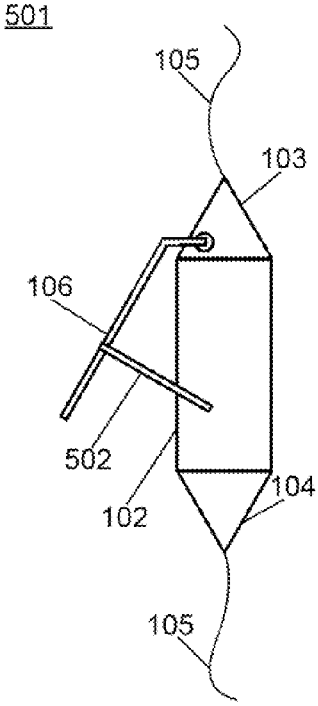 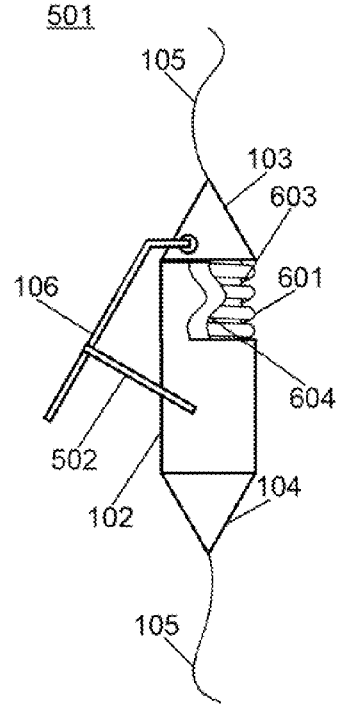
FIG. 10a  FIG. 10b

APPARATUS AND METHOD FOR A MOTORLESS SEISMIC TOOL

BACKGROUND

Technical Field

Embodiments of the subject matter disclosed herein generally relate to an apparatus and method for a motorless seismic tool.

Discussion of the Background

A seismic tool may be a device used to conduct seismic surveys in downhole environments, such as, for example, inside of wells used for oil and gas extraction. Seismic tools may contain sensors, such as, for example, geophones. In order to function properly, a seismic tool that has been lowered into a well may need to be anchored in place with the seismic tool pressed up against the wall of the well. Several seismic tools may be connected together, top to bottom, along with other seismic survey equipment, using a cable, and lowered into a well.

FIG. 1 depicts an exemplary seismic tool. FIG. 2 depicts an exemplary diagram of a seismic tool. The seismic tool 101 may include a main housing 12, upper cable head 13, lower cable head 14, and anchoring arm 16. A logging cable 15 may be connected to the upper cable head 13 at the top and the lower cable head 14 at the bottom of the seismic tool 101. The main housing 12 may be a housing of any suitable shape and made of any suitable material for enclosing any equipment, such as, for example, sensors, motors, and other mechanical, electric, and electronic components, within the seismic tool 101. The upper cable head 13 and the lower cable head 14 may enclose the seismic tool 101 on the top and bottom ends, respectively, and may be made of a similar material to the main housing 12 or any appropriate material. The anchoring arm 16 may be any suitable material in any suitable shape for allowing the seismic tool 101 to be lowered into a well when the anchoring arm 16 is in a closed position, and to anchor the seismic tool 101 against the wall of the well when the anchoring arm 16 is in an open position. For example, the anchoring arm 16 may be made of metal in a curved scoop shape. The anchoring arm 16 may be attached to the main housing 12 in any suitable manner to allow the anchoring arm 16 to switch between closed and open positions. The logging cable 15 may connect the seismic tool 101 to other devices, such as, for example, other seismic tools, telemetry devices, or electronic devices that allow the seismic tool 101 to transmit data to a computer. For example, the seismic tool 101 may be deployed in a string of similar seismic tools, and may be connected to other seismic tools 101 above and below through the logging cable 15. The logging cable 15 may be made of any suitable material for supporting the weight of the seismic tools 101 as they are lowered into a well, and may also include cabling for data and power transmission. The seismic tool 101 may receive power and control commands through the logging cable 15.

FIG. 3 depicts an exemplary diagram of an internal view of a seismic tool with a motor. To use the anchoring arm 16, the seismic tool 101 may include a motor 301 within the main housing 12. The motor 301 may be any suitable motor for use within the seismic tool 101, such as, for example, an electric motor. Any suitable system for motion transmission may be used to allow the motor 301 to operate the anchoring arm 16, such as, for example, interlocked gears 302. The motor 301 may be able to move the anchoring arm 16 between closed and open positions, and may be controlled by commands received through the logging cable 15.

FIGS. 4a and 4b depict an exemplary seismic tool in use within a well. A well 401 may be, for example, a well dug to allow the extraction of oil from oil deposits within the earth. The well 401 may be straight, or may have curved sections, and may have a wall 402, which may be, for example, steel in a tubular shape to keep the earth from filling in the well 401. The seismic tool 101 may be lowered into the well 401 using the logging cable 15. While the seismic tool 101 is being lowered into the well 401 the anchoring arm 16 may be closed, as depicted in FIG. 4a. When the seismic tool 101 has reached a desired position within the well 401 the anchoring arm 16 may be opened by the motor 301. The anchoring arm 16 may open until it has anchored the seismic tool 101 within the well 401, with the main housing 102 and the anchoring arm 16 pressing against the wall 402 of the well 401.

The motor 301 used to operate the anchoring arm 16 may be expensive, heavy, and susceptible to malfunction within the environment of the well 401, which may include a mixture of oil, water, gas, and fluids used in oil and gas extraction. The weight of the motors 301 in a series of connected seismic tools 101 may contribute to fatigue in the logging cable 15, and make movement and handling of the seismic tools 101 more difficult. The motor 301 may also increase the amount of power needed to operate multiple seismic tools 301.

Thus, there is a need for an apparatus and method for anchoring a seismic tool within a well without using a motor.

SUMMARY

In various embodiments, an apparatus and method is provided for a motorless seismic tool.

In one embodiment, there is an apparatus for a motorless seismic tool that includes a body; a motorless clamping mechanism connected to the body; and an anchoring arm attached to the body and the motorless clamping mechanism. The motorless clamping mechanism is configured to close or open the anchoring arm based on gravity.

According to another embodiment, there is an apparatus for a conducting a seismic survey including a telemetry unit; an end unit and at least one motorless seismic tool disposed between the telemetry unit and the end unit.

According to still another embodiment, there is a method for deploying motorless seismic tools in a well. The method includes lowering the motorless seismic tools to a desired position within a well; stopping the lowering when the motorless seismic tools reach the desired position within the well; causing an end unit to anchor within the well; lowering the motorless seismic tools further into the well to cause the lowest motorless seismic tool that is not anchored to anchor until all of the motorless seismic tools are anchored within the well; and stopping the lowering of the motorless seismic tools further into the well.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 9a and 9b depict exemplary diagram views of a motorless seismic tool including a secondary housing with an anchoring arm in a closed position;

FIGS. 10a and 10b depict exemplary diagram views of a motorless seismic tool including a secondary housing with an anchoring arm in an open position;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. In various embodiments as illustrated in FIGS. 1-16, an apparatus and method for a motorless seismic tool is provided.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
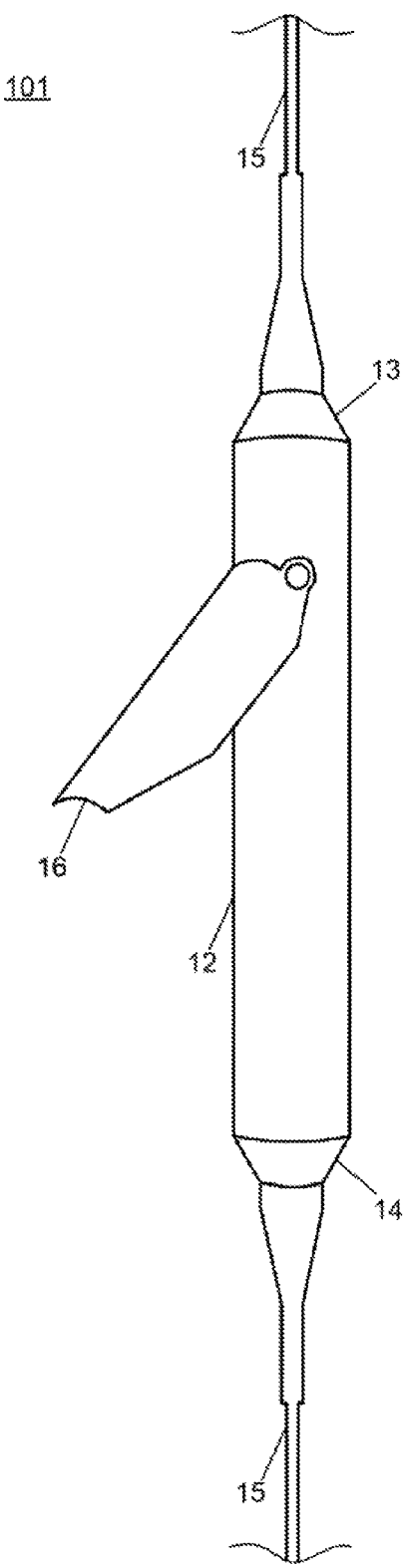
FIG. 1 depicts an exemplary seismic tool.
Figure 2:
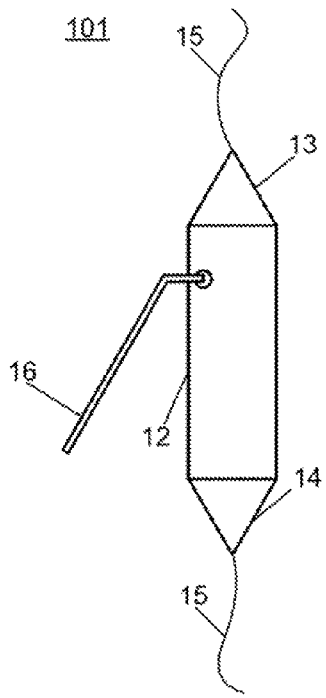
FIG. 2 depicts an exemplary diagram of a seismic tool.
Figure 3:
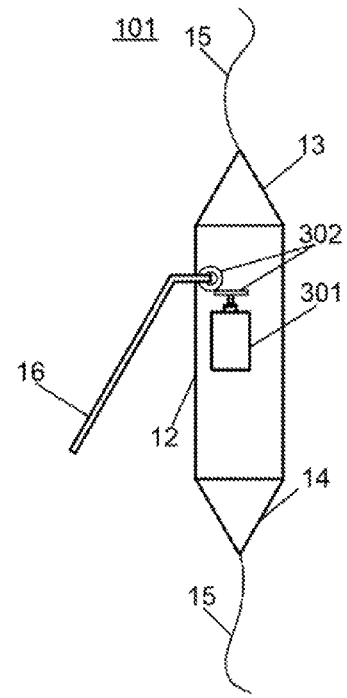
FIG. 3 depicts an exemplary diagram of an internal view of a seismic tool with a motor.
Figure 4A:
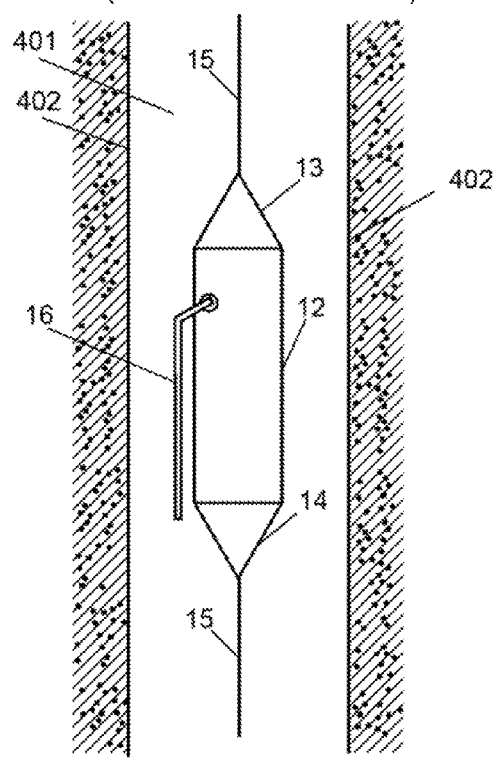
FIGS. 4a and 4b depict an exemplary seismic tool in use within a well.
Figure 4B:
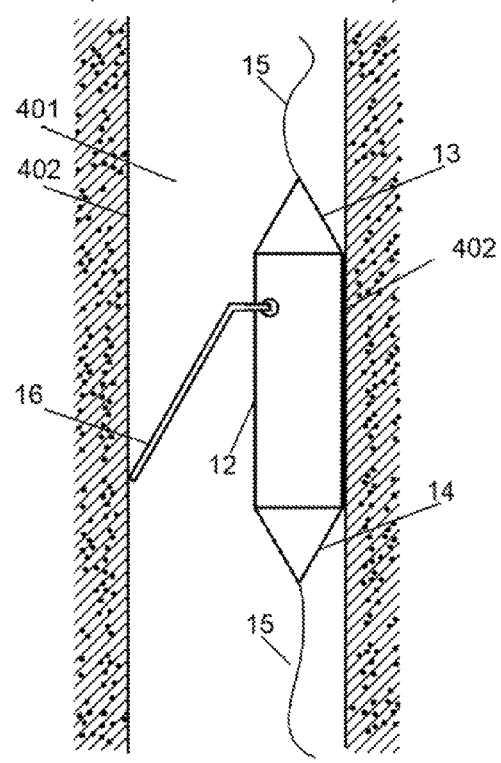
Figure 5:
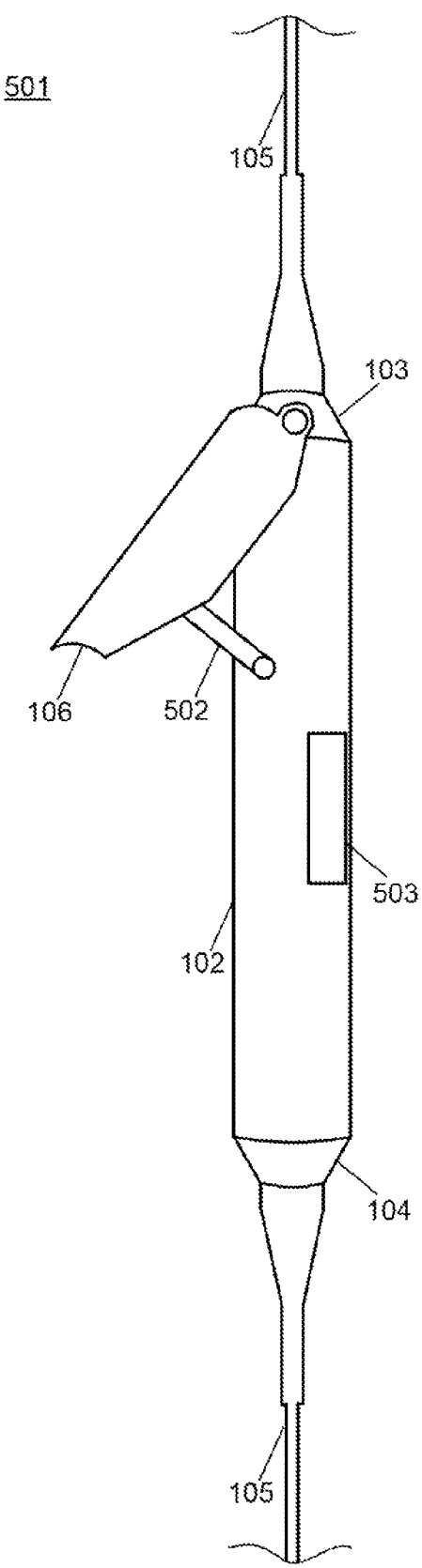
FIG. 5 depicts an exemplary motorless seismic tool.

FIG. 5 depicts an exemplary motorless seismic tool. The motorless seismic tool 501 may include a main housing 102, an upper cable head 103, a lower cable head 104, and an anchoring arm 106, similar to the seismic tool 101. The upper cable head 103 may be separable from the main housing 102. The anchoring arm 106 of the motorless seismic tool 501 may be attached to the upper cable head 103, and a control arm 502 may be attached to the main housing 102 and the anchoring arm 106. The motorless seismic tool 501 may also include at least one sensor 503. The sensor 503 may be contained within the main housing 102, and may be a hydrophone, geophone, accelerometer, temperature sensor, density sensor, gravitometer, or any other suitable type of sensor or combination of sensors.

The control arm 502 may be attached to both the main housing 102 and the anchoring arm 106 in any suitable manner to allow the control arm to rotate at both ends. Any motion of the joint between the control arm 502 and the main housing 102 towards or away from the joint between the anchoring arm 106 and the upper cable head 103 may be translated into motion of the anchoring arm 106 at the joint between the anchoring arm 106 and the control arm 502.

Figure 6:
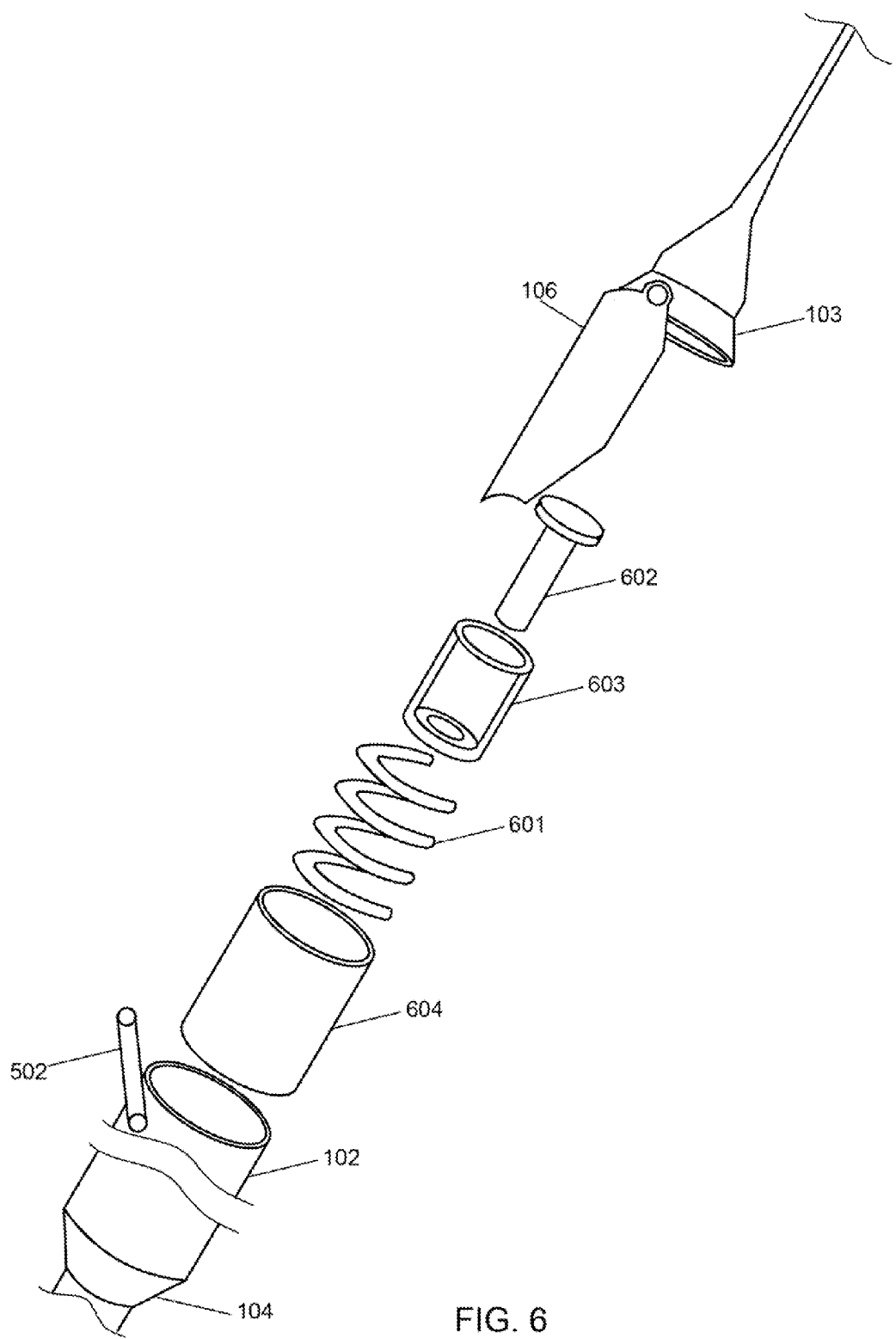
FIG. 6 depicts an exemplary exploded view of a motorless seismic tool.

FIG. 6 depicts an exemplary exploded view of a motorless seismic tool. The motorless seismic tool 501 may include an anchoring spring 601, a piston 602, and a chamber 603. Note that piston 602 does not seal chamber 603 and does not have to have an exterior diameter that matches an interior diameter of chamber 603. In other words, the exterior diameter of piston 602 may be substantially less than the interior diameter of chamber 603. The motorless seismic tool 501 may also include a secondary housing 604. The chamber 603 may be attached to the upper cable head 103 in any suitable manner, such as, for example, bolts, screws, or welding. The piston 602 may be attached to the main housing 102, for example, by being welded or bolted to a suitable support structure within the main housing 102, or may be formed as part of the main housing 102. In one application, the piston 602 may be attached to the upper cable head 103 and the chamber 603 may be attached to the main housing 102. The piston 602 may be inserted into the chamber 603, with the shaft of the piston 602 going through an appropriately sized opening in the base of the chamber 603 such that, for example, the head of the piston 602 may be able to travel between resting at the bottom of the chamber 603 and being even with the top of the chamber 603 as the shaft travels through the opening. The piston 602 and the chamber 603 may act as a mechanical stop for both the expansion and contraction of the motorless seismic tool 501, with the piston 602 being stopped when the head of the piston 602 contacts the bottom of the chamber 603 or the top of the chamber 603. The piston 602 and the chamber 603 may be made from any suitable material, and may be in any suitable shape for use within the main housing 102 of the motorless seismic tool 501. For example, as depicted in FIG. 6, the piston 602 and the chamber 603 may be cylindrical. Other suitable mechanisms may be used in place of the piston 602 and the chamber 603 as a mechanical stop, such as, for example, a rope.

The anchoring spring 601 may be wrapped around the outside of the chamber 603. The anchoring spring 601 may be any suitable spring or coil, such as an extension spring, with any suitable number of windings and made of any suitable material, may have any suitable spring force, and may be of suitable strength during contraction to cause the piston 602 to rise within the chamber 603 and draw the main housing 102 and the upper cable head 103 towards each other. One or more of the upper coils, or the top end, of the anchoring spring 601 may be attached to the top of the chamber 603 or the upper cable head 103, and one or more of the lower coils, or the bottom end, of the anchoring spring 601 may be attached to the main housing 102. The piston 602 and the chamber 603 may serve to limit the degree to which the anchoring spring 601 can extend and contract. Alternatively, more than one spring or coil in any suitable arrangement may be used as the anchoring spring 601. The anchoring spring 601 may have a stiffness such that level of strain that occurs in the anchoring spring 601 when the anchoring spring 601 is subject only to the weight of the logging cable 105 may not cause the anchoring spring 601 to contract enough to release the anchoring arm 106, unanchoring the motorless seismic tool 501.

The secondary housing 604 may be, for example, a housing of similar material and shape to the main housing 102, and may be of suitable size to be contained within the main housing 102. The secondary housing 604 may be attached to the upper cable head 103 in any suitable manner, and may enclose the anchoring spring 601, the piston 602, and the chamber 603. When the anchoring spring 601 is contracted, for example, in a resting state, the secondary housing 604 may be contained within the main housing 102. When the anchoring spring 601 is extended, the secondary housing 604 may be exposed, and may serve to protect the anchoring spring 601 from the environment outside of the motorless seismic tool 501.

The mechanical stop used by the motorless seismic tool 501 may also include a dampener. The dampener may be any suitable mechanism or adjustment to the mechanical stop that may prevent unwanted deployment of the anchoring arm 106 by the anchoring spring 601. The dampener may be, for example, oil added into the chamber 603, that may slow the movement of the piston 602 within the chamber 603. The dampener may also be, for example, a trigger. The trigger may hold the anchoring arm 106 in place until the trigger is activated, for example, by the motion of the piston 602 within the chamber 603.

Figure 7A:
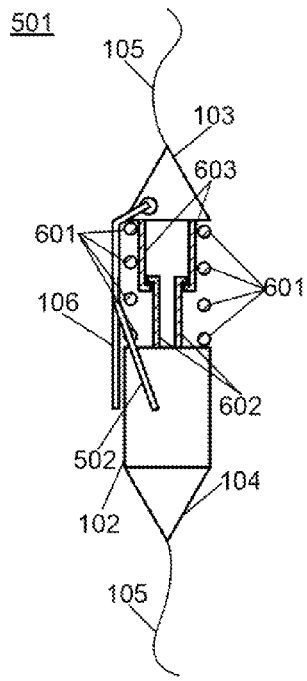
FIGS. 7a, 7b, and 7c depict exemplary diagram views of a motorless seismic tool with an anchoring arm in a closed position.
Figure 7B:
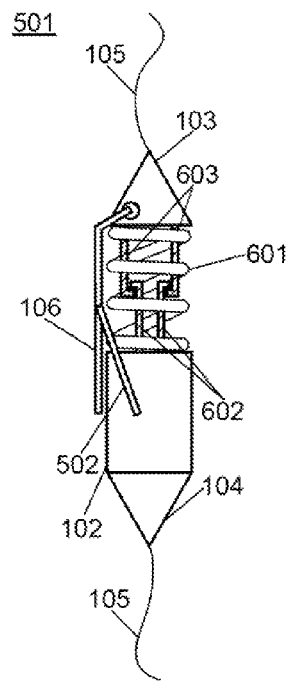
Figure 7C:
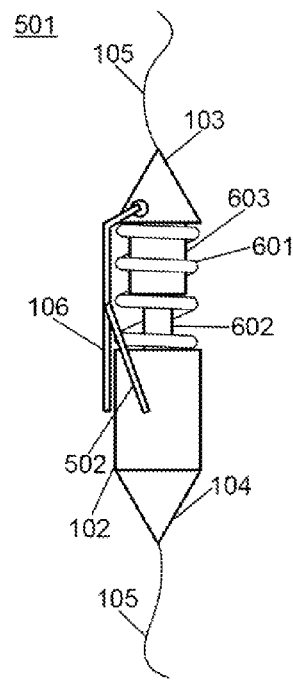

FIGS. 7a, 7b, and 7c depict exemplary diagram views of a motorless seismic tool with an anchoring arm in a closed position. FIG. 7a depicts an exemplary cross-sectional view of the coils of the anchoring spring 601, the piston 602, and the chamber 603, when the anchoring spring 601 is extended. FIG. 7b depicts an exemplary view of the extended anchoring spring 601 wrapped around a cross-sectional view of the piston 602 and the chamber 603. FIG. 7c depicts an exemplary view of the extended anchoring spring 601 wrapped around the piston 602 and the chamber 603. Arm 502 may be attached to anchoring arm 106, for example, with a bolt. When the seismic tool 501 is subjected to forces that pull the lower cable head 104 away from the upper cable head 103, the anchoring spring 601 may extend and the head of the piston 602 may move towards the bottom of the chamber 603. The anchoring arm 106 and the control arm 502 may be arranged so that when the head of the piston 602 is at the bottom of the chamber 603, the control arm 502 may hold the anchoring arm 106 in a closed position against the main housing 102.

Figure 8A:
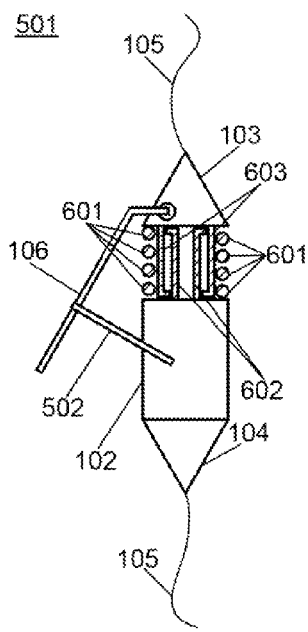
FIGS. 8a, 8b, and 8c depict exemplary diagram views of a motorless seismic tool with an anchoring arm in an open position.
Figure 8B:
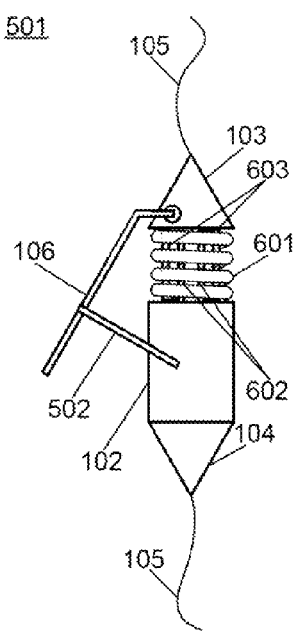
Figure 8C:
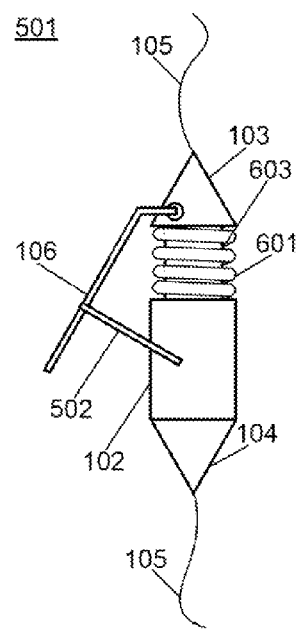

FIGS. 8a, 8b, and 8c depict exemplary diagram views of a motorless seismic tool with an anchoring arm in an open position. FIG. 8a depicts an exemplary cross-sectional view of the coils of the anchoring spring 601, the piston 602, and the chamber 603 when the anchoring spring 601 is contracted. FIG. 8b depicts an exemplary view of the contracted anchoring spring 601 wrapped around a cross-sectional view of the piston 602 and the chamber 603. FIG. 8c depicts an exemplary view of the extended anchoring spring 601 wrapped around the piston 602 and the chamber 603. When the seismic tool 501 is not subjected to forces that pull the lower cable head 104 away from the upper cable head 103, the anchoring spring 601 may be contracted, for example, in a resting state, and the head of the piston 602 may be at the top of the chamber 603. The anchoring arm 106 and the control arm 502 may be arranged so that when the piston 603 is at the bottom of the chamber 603, the control arm 502 may hold the anchoring arm 106 in an open position away from the main housing 102.

FIGS. 9a and 9b depict exemplary diagram views of a motorless seismic tool including a secondary housing with an anchoring arm in a closed position. FIG. 9a depicts an exemplary view of the secondary housing 604 when the anchoring spring 601 is extended. FIG. 9b depicts an exemplary cut-away view of the secondary housing 604 when the anchoring spring 601 is extended. When the anchoring spring 601 is extended and the anchoring arm 106 is closed, the secondary housing 604 may be extended from the main housing 102, and may protect the anchoring spring 601, part of the piston 602 within the chamber 603, and the chamber 603.

FIGS. 10a and 10b depict exemplary diagram views of a motorless seismic tool including a secondary housing with an anchoring arm in an open position. FIG. 10a depicts an exemplary view of the main housing 102 when the anchoring spring 601 is contracted. FIG. 10b depicts an exemplary cut-away view of the main housing 102 and the secondary housing 604 when the anchoring spring 601 is contracted. When the anchoring spring 601 is contracted and the anchoring arm 106 is open, the secondary housing 604 may be retracted within the main housing 102. The anchoring spring 601, the piston 602, and the chamber 603 may be contained within both the main housing 102 and the secondary housing 604.

When the anchoring spring 601 transitions between an extended state, as depicted in FIGS. 7a, 7b, and 7c, and a contracted state as depicted in FIGS. 8a, 8b, and 8c, the anchoring arm 106 may move as well. The anchoring arm 106 may move towards an open position while the anchoring spring 601 contracts, and towards a closed position when the anchoring spring 601 extends.

Figure 11:
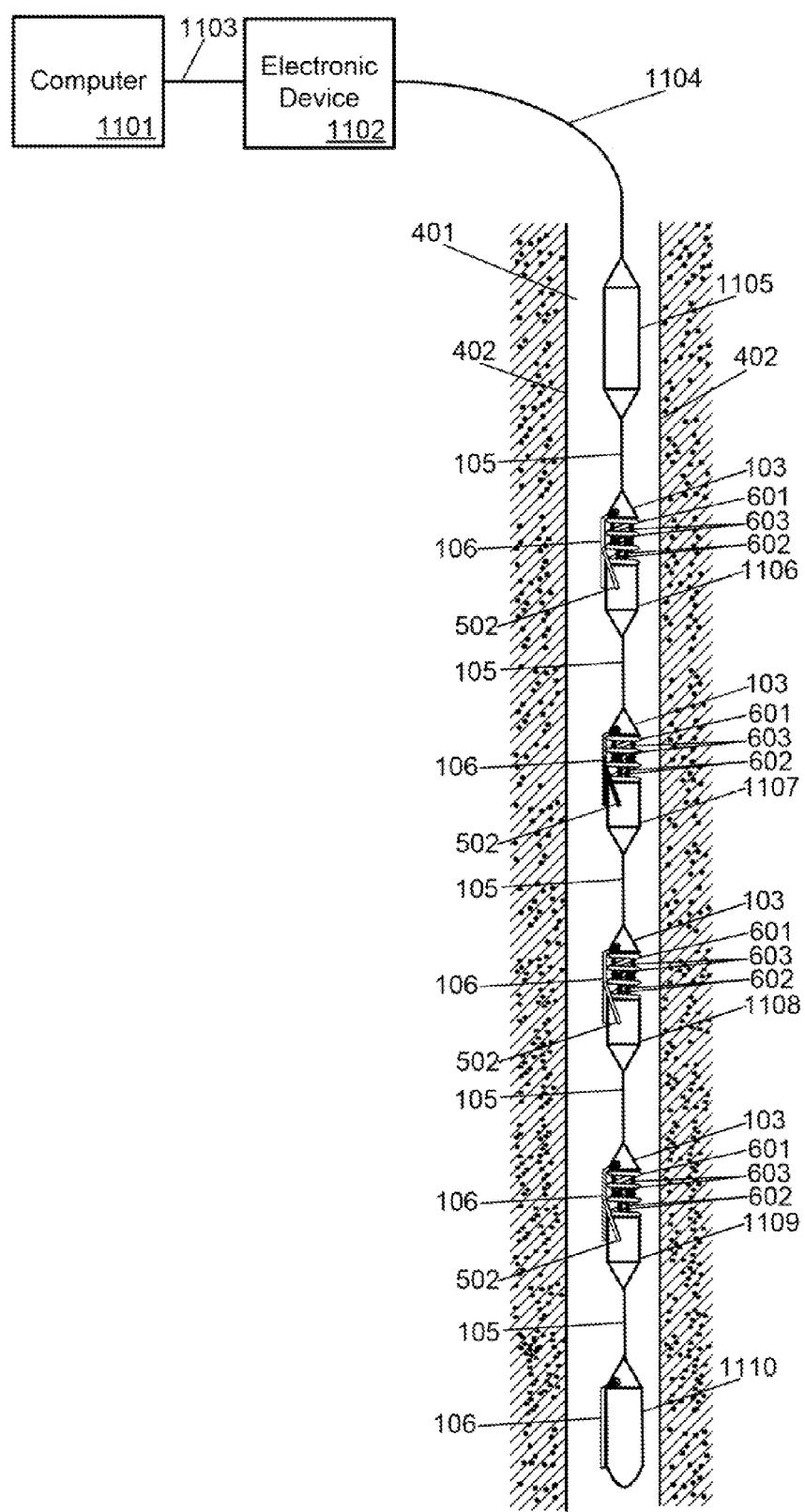
FIG. 11 depicts exemplary motorless seismic tools deployed within a well before being anchored.

FIG. 11 depicts exemplary motorless seismic tools deployed within a well before being anchored. To conduct a seismic survey of the earth surrounding the well 401, a number, such as, for example, 20 to 25, of the seismic tools 501 may be lowered into the well 401, along with other seismic survey equipment. For example, as depicted in FIG. 11, the motorless seismic tools 1106, 1107, 1108, and 1109 may be exemplary motorless seismic tools 501. The motorless seismic tools 1106, 1107, 1108, and 1109 may be lowered into the well 401 from the surface by the logging cable 1104. The logging cable 105 may connect the motorless seismic tools 1106, 1107, 1108, and 1109 to each other, a telemetry unit 1105 and an end unit 1110. The logging cable 1104 may connect an electronic device 1102 on the surface to the telemetry unit 1105, and may be used to control the descent and ascent of all of the seismic survey equipment within the well 401. In one application, the logging cable 1104 may be different from logging cable 105. The electronic device 1102 may serve as an interface between the motorless seismic tools 1106, 1107, 1108, and 1109 and a computer 1101 through a link 1103. The computer 1101 may be any suitable computing device for gathering data from and sending commands to the motorless seismic tools 1106, 1107, 1108, and 1109, and the end unit 1110. The telemetry unit 1105 may collect data from sensors in the motorless seismic tools 1106, 1107, 1108, and 1109, and the end unit 1110 for transmission to the electronic device 1102 and the computer 1101. The end unit 1110 may be structured similarly to the seismic tool 101, and may be a motor unit including the motor 301 to operate the anchoring arm 106, and may also include additional mass which may facilitate the lowering of the end unit 1110 and attached seismic survey equipment into the well 401. The end unit 1110 may include the same sensors as the motorless seismic tools 501. In one application, there is a end unit 1110 for any N motorless seismic tools 501, where N is a number between 2 and 20. In one application, N is 10. The end unit 1110 may use any suitable form of activation for the anchoring arm 106. The end unit 110 may also be a weight with no anchoring arm 106.

While the motorless seismic tools 1106, 1107, 1108, and 1109 are being lowered into the well 401 by the logging cable 1104, the end unit 1110 may be supported by the logging cable 105 between the end unit 1110 and the motorless seismic tool 1109. This may create tension in the logging cable 105 between the end unit 1110 and the motorless seismic tool 1109. The tension in the logging cable 105 may pull down on the lower cable head 104 and the main housing 102 of the motorless seismic tool 1110 causing its anchoring spring 601 to extend and its anchoring arm 106 to be in the closed position, for example, as depicted in FIGS. 7*a*, 7*b*, and 7*c*. This effect may be repeated with the other motorless seismic tools 1106, 1107, and 1108, as tension in the logging cable 105 from the weight of lower equipment causes expansion of the anchoring springs 601.

Figure 12:
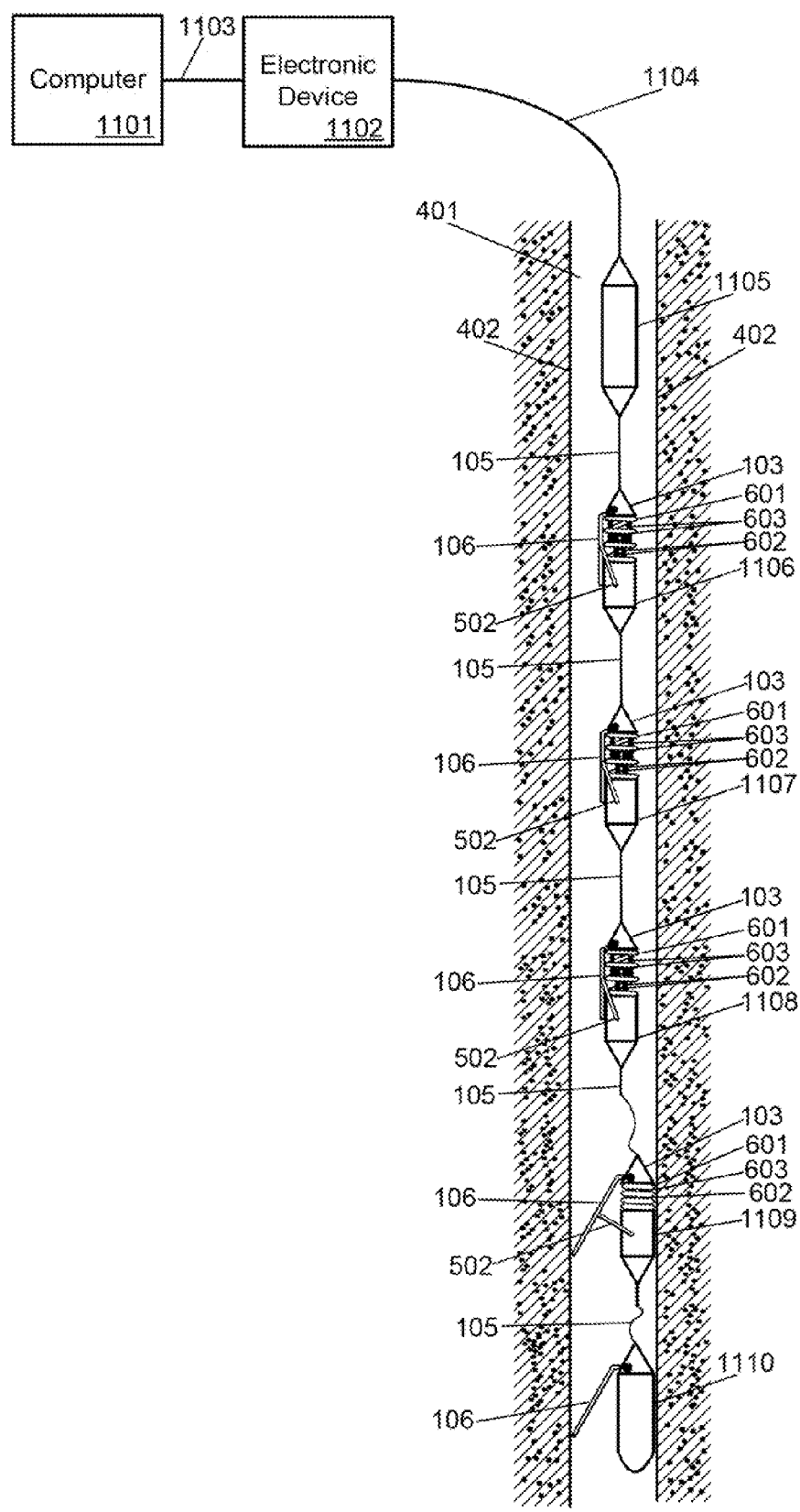
FIG. 12 depicts exemplary motorless seismic tools deployed within a well where a motorless seismic tool is anchored.

FIG. 12 depicts exemplary motorless seismic tools deployed within a well where a motorless seismic tool is anchored. After the motorless seismic tools 501 deployed within the well 401 have reached their desired positions, the motorless seismic tools 501 may be anchored. For example, as depicted in FIG. 12, the anchoring arm 106 of the end unit 1110 may be opened. The end unit 1110 may use the motor 301, or any other suitable mechanism (e.g., bow springs, electromagnetic systems, explosives, etc.), to open the anchoring arm 106 after receiving a command from the computer 1101. The end unit 1110 may also rest on the bottom of the well 401 instead of deploying the anchoring arm 106. In another embodiment, the end unit 1110, which would rest on the bottom of the well, would be a simple weight and not be an electronic module. In other words, end unit 1110 may have no components, contrary to seismic tool 501 illustrated in FIG. 5, just a simple weight that maintains the anchoring arm of the unit above closed. Then, as explained further in this paragraph, the next seismic tool is lowered until its anchoring arm opens and the seismic tool is anchored to the well. Once the end unit 1110 is anchored within the well 401, or resting on the bottom of the well 401, the motorless seismic tools 1106, 1107, 1108, and 1109 may be slightly lowered in the well 401 so that the tension in the logging cable 105 between the end unit 1110 and the motorless seismic tool 1109 and the weight pulling down on the anchoring spring 601 may both decrease. The logging cable 105 between the end unit 1110 and the motorless seismic tool 1109 may slacken. The decrease in weight pulling down on the anchoring spring 601 may allow the anchoring spring 601 to contract, pulling up the slack in the logging cable 105. The contraction of the anchoring spring 601 may cause the piston 602 to move up in the chamber 603 and may draw the main housing 102 of the motorless seismic tool 1109 upwards towards the upper cable head 103. The joint between the control arm 502 and the main housing 102 may move upwards along with the main housing 102, which may in turn cause the anchoring arm 106 to open. Once the anchoring arm 106 has contacted the wall 402, the anchoring arm 106 may push against the wall 402 as the anchoring arm 106 continues opening, causing the main housing 102 to be pushed up against the wall 402 opposite the anchoring arm 106. After the main housing 102 is pushed against the wall 402 and held in place by the anchoring arm 106, the anchoring arm 106 may be physically prevented from opening any further. This may arrest the upwards motion of the main housing 102, preventing further contraction of the anchoring spring 601. The motorless seismic tool 1109 may be anchored. Next, the other motorless seismic tools 1106, 1107, and 1108 may be further lowered into the well 401 to engage the anchoring arm 106 of the next motorless seismic tool 1108. This process may continue until the anchoring arms 106 of all the motorless seismic tools 1106, 1107, 1108 and 1109 are in the opened position. As noted above, an end unit 1110 may be present between a given number of the motorless seismic tools 501 to facilitate this process.

Figure 13:
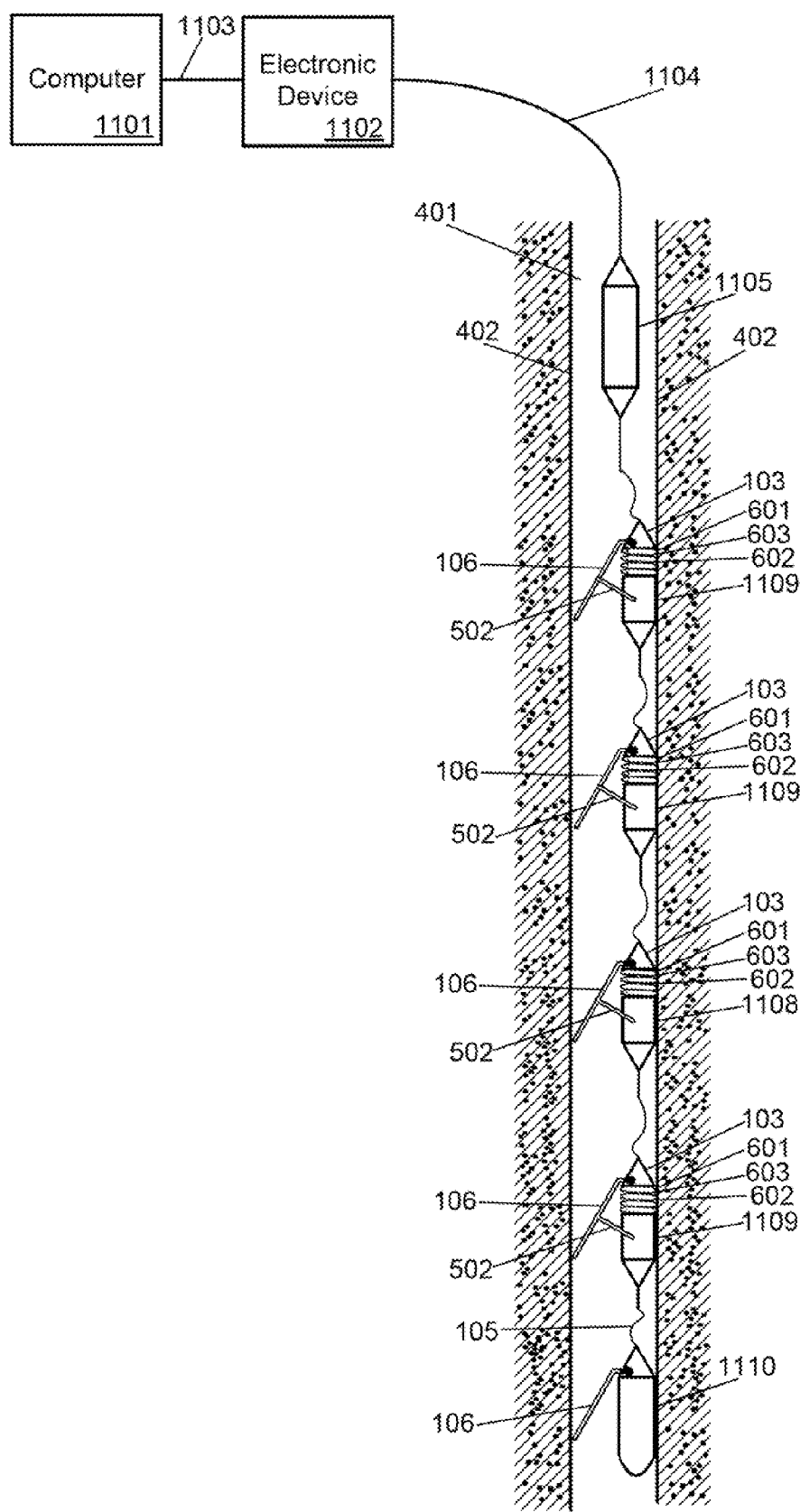
FIG. 13 depicts exemplary motorless seismic tools deployed within a well where the all motorless seismic tools are anchored.

FIG. 13 depicts exemplary motorless seismic tools deployed within a well where all the motorless seismic tools are anchored. After the motorless seismic tool 1109 is anchored within the well 401, the other motorless seismic tools 1106, 1107, and 1108, may anchor in a similar manner. The anchoring of the motorless seismic tool 1109 may remove weight pulling down on the motorless seismic tool 1108 through tension in the logging cable 105, similar to the manner in which the anchoring of the end unit 1110 removed weight pulling down on the motorless seismic tool 1109, as described in FIG. 12. This may allow the anchoring spring 601 of the motorless seismic tool 1108 to contract, opening the anchoring arm 106 of the motorless seismic tool 1108 and anchoring the motorless seismic tool 1108 within the well 401. The anchoring of the motorless seismic tool 1108 may remove the weight pulling down on the motorless seismic tool 1107, which may then anchor in the same manner as the motorless seismic tools 1108 and 1109. The anchoring of the motorless seismic tool 1107 may in turn remove the weight pulling down on the motorless seismic tool 1106, which may also anchor. As depicted in FIG. 13, all of the motorless seismic tools 1106, 1107, 1108 and 1109 may anchor within the well 401 once the end unit 1110 has used the motor 301 to anchor.

The motorless seismic tools 1106, 1107, 1108, and 1109 anchored within the well 401 may be un-anchored as now discussed. When the time comes to un-anchor the motorless seismic tools 1106, 1107, 1108, and 1109, the operator may pull up the top most motorless seismic tool 1107 through the logging cable 1104, the telemetry unit 1105, and the logging cable 105. When this occurs, the anchoring spring 601 of the motorless seismic tool 1107 may start to extend and slowly brings anchoring arm 106 to a closed position, thus releasing the motorless seismic tool 1107. By continuing to pull up on the next motorless seismic tool 1108, its anchoring spring 601 may start to extend, which results in the anchoring arm 106 changing from an opened position to a closed position. The un-anchoring procedure may then repeat with the motorless seismic tools 1106 and 1107. When the last anchored unit is the end unit 1110, the operator may send an instruction from the computer 1101 to close the anchoring arm 106 by using its motor 301, or other suitable mechanism. If the end unit 1110 is not anchored, but is resting on the bottom of the well 401, the end unit 1110 may be pulled up.

Figure 14:
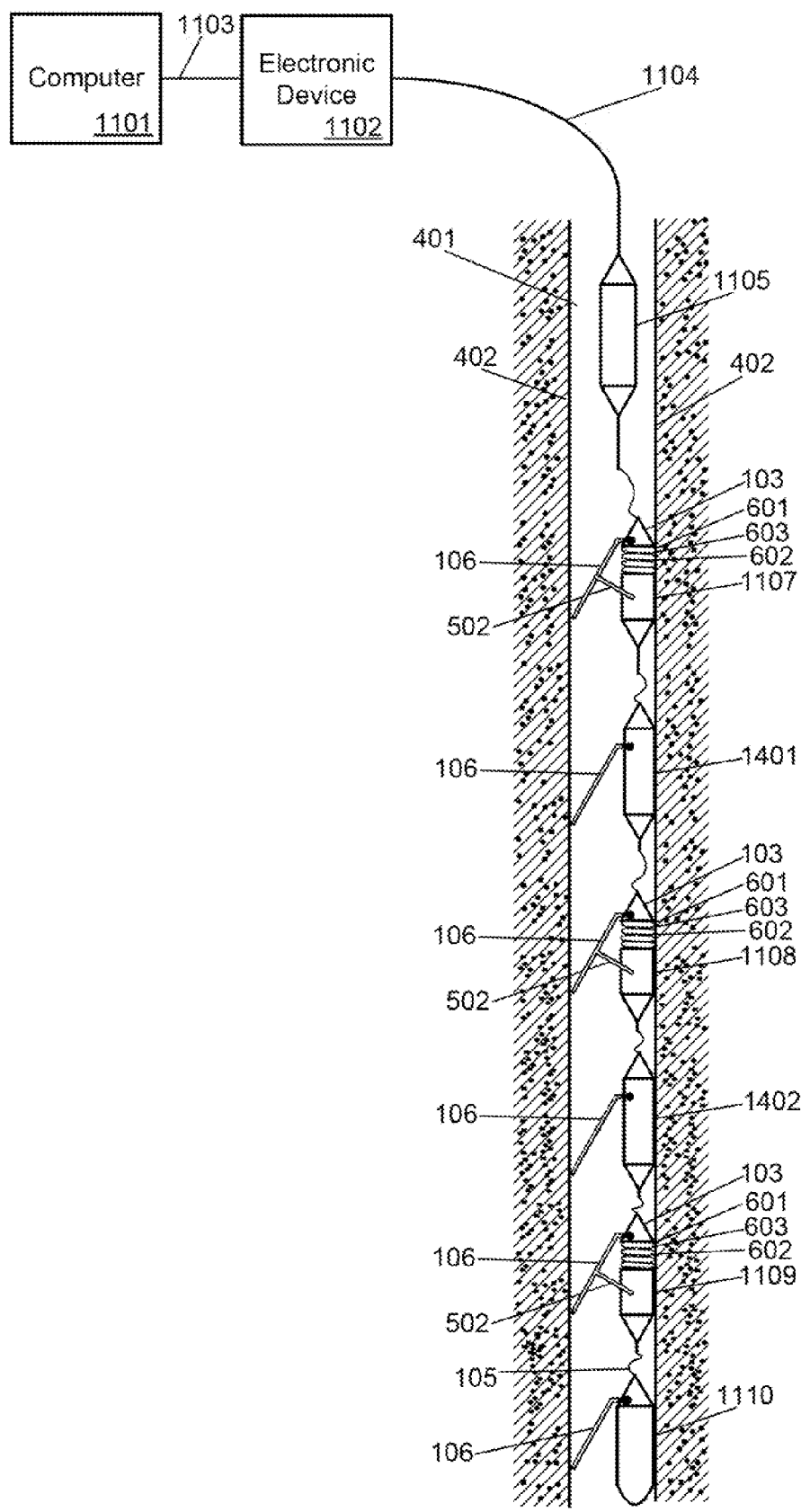
FIG. 14 depicts exemplary motorless seismic tools and seismic tools with motors deployed and anchored within a well.

As depicted in FIGS. 11, 12 and 13, all of the seismic tools connected between the telemetry unit 1105 and the end unit 1110 may be motorless seismic tools 501. Alternatively, a mixture of motorless seismic tools 501 and seismic tools 101 with motors 301 may be used. FIG. 14 depicts exemplary motorless seismic tools and seismic tools with motors deployed and anchored within a well. In this embodiment, unit 1110 may be a weight unit having no sensors. When mixing units of the motorless seismic tool 501 and the seismic tool 101, any suitable ratio and arrangement may be used. For example, as depicted in FIG. 14, the exemplary motorless seismic tools 1107, 1108, and 1109 may alternate with seismic tools 1401 and 1402, which may be exemplary seismic tools 101 and may include motors 301. The seismic tools 1401 and 1402 may control the anchoring of the motorless seismic tools 1107 and 1108, respectively, similar to the manner in which end unit 1110 may control the anchoring of the motorless seismic tool 1109, as described previously. Commands from the computer 1101 may, for example, cause the seismic tool 1401 to anchor using the motor 301 and the anchoring arm 106. Once the seismic tool 1401 is anchored, the motorless seismic tool 1107 may also anchor as described previously, regardless of whether any of the lower motorless seismic tool 1108 and 1109, the seismic tool 1402, or the end unit 1110, has anchored.

Figure 15:
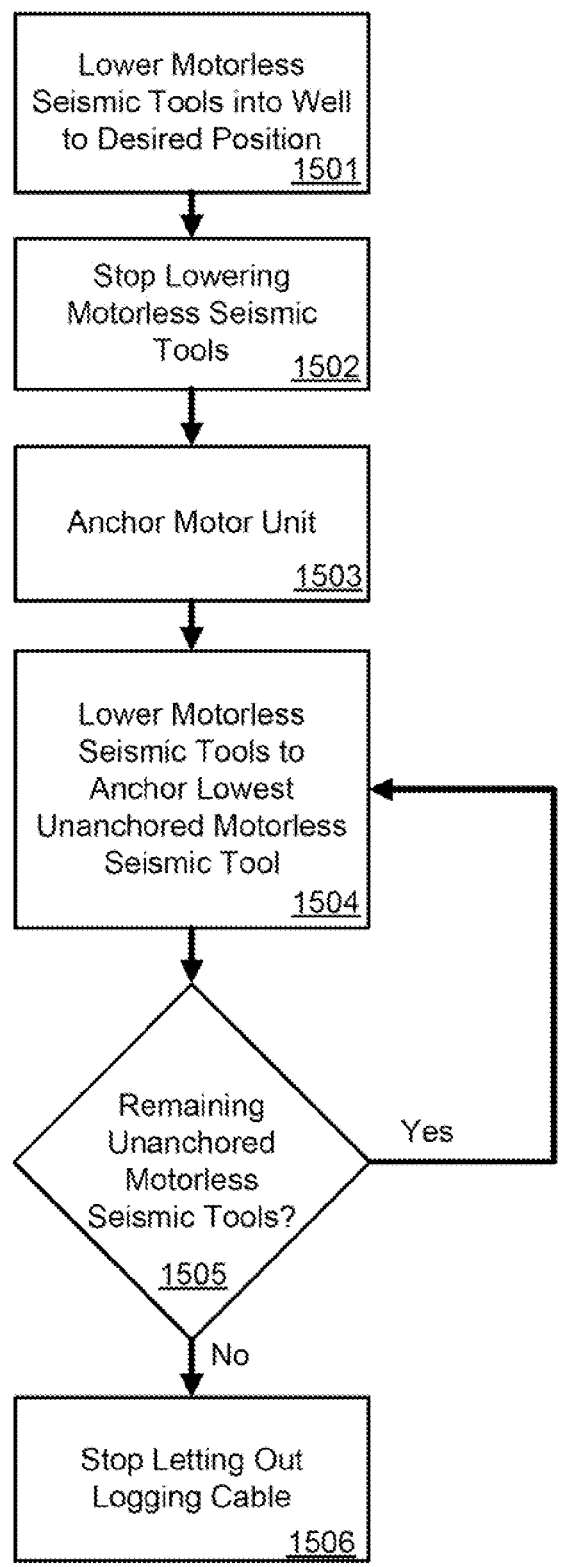
FIG. 15 depicts an exemplary procedure for anchoring motorless seismic tools.

FIG. 15 depicts an exemplary procedure for anchoring motorless seismic tools. In block 1501, motorless seismic tools may be lowered to a desired position within a well. For example, as depicted in FIG. 11, several motorless seismic tools 501, along with other seismic survey equipment, may be lowered from the surface into the well 401 with the logging cable 1104. The motorless seismic tools 501 may be lowered until they are in a desired position within the well 401.

In block 1502, the lowering of the motorless seismic tools may be stopped. For example, once the motorless seismic tools 501 have reached the desired position within the well 401, the letting out of the logging cable 1104 on the surface may be stopped, causing the motorless seismic tools 501 to stop being lowered into the well 401.

In block 1503, an end unit may be anchored. For example, as depicted in FIG. 12, the end unit 1110 may receive a command from the computer 1101 to anchor. The end unit 1110 may use the motor 301, or other suitable mechanism, to cause the anchoring arm 106 to contact the wall 402 and push the end unit 1110 against the opposite part of the wall 402, anchoring the end unit 1110. The end unit 1110 may also be resting on the bottom of the well 401, in which case the anchoring arm 106 may not be needed to anchor the end unit 1110.

In block 1504, the motorless seismic tools may be lowered to anchor the lowest unanchored motorless seismic tool. For example, the unanchored motorless seismic tool 501 immediately above either an end unit 1110 or other motorless seismic tool 501 that has just anchored may be the lowest unanchored motorless seismic tool 501. By lowering the motorless seismic tools 501, for example, using the logging cable 1104, slack may develop in the logging cable 105 between the just anchored seismic survey equipment and the lowest unanchored motorless seismic tool 501. Slack in the logging cable 105 may allow the anchoring spring 601 of lowest unanchored motorless seismic tool 501 to contract, causing the control arm 502 to move the anchoring arm 106 into an open position. This may result in lowest unanchored motorless seismic tool 501 becoming anchored within the well 401.

In block 1505, it may be determined whether there are any unanchored motorless seismic tools left in the well. The determination may be made in any suitable manner, such as, for example, through data received at the computer 1101 from the motorless seismic tools 501. If all of the motorless seismic tools 501 within the well 401 have anchored, for example, as in FIG. 13, flow may proceed to block 1506. Otherwise, flow proceeds back to block 1504, where the new lowest unanchored motorless seismic tool 501 may anchor.

In block 1506, the letting out of the logging cable may be stopped. Once all of the motorless seismic tools 501 have anchored, for example, as depicted in FIG. 13, the logging cable 1104 may no longer be let out, as the motorless seismic units 501 are anchored and letting out the logging cable 1104 will no longer lower them.

Figure 16:
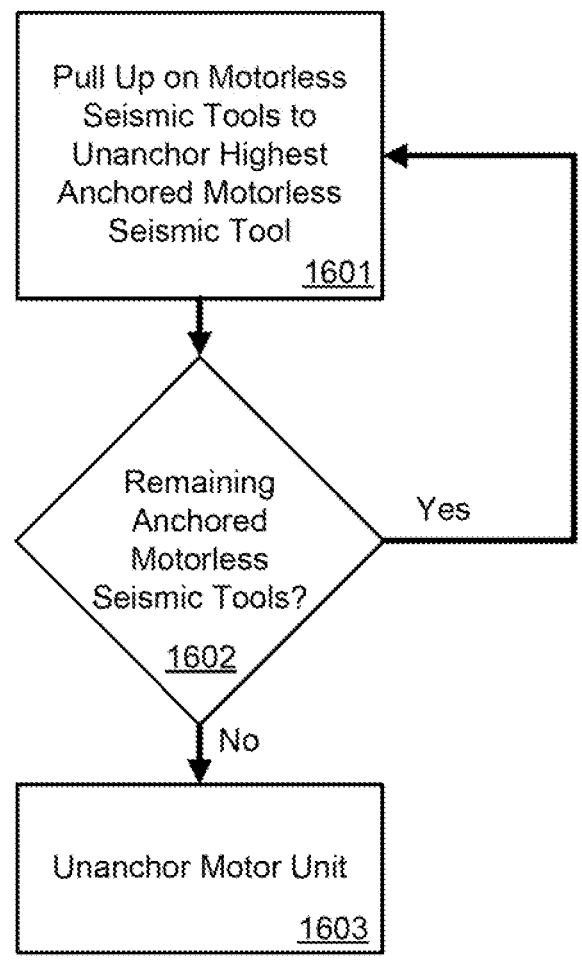
FIG. 16 depicts an exemplary procedure for unanchoring motorless seismic tools.

FIG. 16 depicts an exemplary procedure for unanchoring motorless seismic tools. In block 1601, the motorless seismic tools may be pulled up to unanchor the highest anchored motorless seismic tool. For example, the logging cable 1104 may be used to pull up on the anchored motorless seismic tools 501. The force of the logging cable 1104 pulling upwards may pull up the logging cable 105 connected to the highest unanchored motorless seismic tool 501. This may cause the upper cable head 103 of the highest unanchored motorless seismic tool 501 to move upwards, the anchoring spring 601 to extend, and the control arm 502 to move the anchoring arm 106 to a closed position, unanchoring the motorless seismic tool 501.

In block 1602, it may be determined whether there are any anchored motorless seismic tools left in the well. The determination may be made in any suitable manner, such as, for example, through data received at the computer 1101 from the motorless seismic tools 501. If all of the motorless seismic tools 501 within the well 401 have unanchored, for example, as in FIG. 11, flow may proceed to block 1603. Otherwise, flow proceeds back to block 1601, where the new highest anchored motorless seismic tool 501 may unanchor.

In block 1603, an end unit may be unanchored. For example, after all of the motorless seismic tools 501 have been unanchored, the end unit 1110 may be unanchored. The end unit 1110 may receive a command from the computer 1101 to unanchor. The end unit 1110 may use the motor 301, or other suitable mechanism, to cause the anchoring arm 106 to close, unanchoring the end unit 1110. The end unit 1110 and the motorless seismic tools 501 may then be retrieved from or moved into a different position within the well 401.

The motorless seismic tools 501 may be unanchored from the well 401 in any other suitable manner. For example, a tractor at the deepest end of the well may be used to pull down on the lowest motorless seismic tool 501 within the well 401, causing the motorless seismic tool 501 to unanchor from the well 401, and resulting in the unanchoring of the rest of the motorless seismic tools 501.

The disclosed exemplary embodiments provide an apparatus and method for a motorless seismic tool. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An apparatus for a motorless seismic tool comprising:
   a body;
   a motorless clamping mechanism connected to the body; and an anchoring arm attached to the body and the motorless clamping mechanism, wherein the motorless clamping mechanism is configured to close or open the anchoring arm based on gravity, wherein the body comprises a main housing, an upper cable head, and a lower cable head, and wherein the motorless clamping mechanism comprises a control arm attached to the main housing and the anchoring arm, a mechanical stop attached to the main housing, and an anchoring spring attached to the main housing and at least one of a chamber of the mechanical stop and the upper cable head, and disposed on the outside of the chamber.

2. The apparatus of claim 1, further including a dampener.

3. The apparatus of claim 1, wherein the control arm is adapted to cause the anchoring arm to open when the anchoring spring contracts and to cause the anchoring arm to close when the anchoring spring extends.

4. The apparatus of claim 1, wherein the anchoring arm is adapted to extend when the distance between the lower cable head and the upper cable head is increased.

5. The apparatus of claim 1, wherein the distance between the lower cable head and the upper cable head is increased by a pulling force applied to the lower cable head or to the upper cable head.

6. The apparatus of claim 1, wherein the anchoring arm is adapted to contract and reduce the distance between the lower cable head and the upper cable head.

7. The apparatus of claim 1, further comprising a logging cable.

8. The apparatus of claim 7, wherein the logging cable is adapted to attach the lower cable head to one of a motorless seismic tool, a seismic tool with a motor, an end unit, and a telemetry unit.

9. The apparatus of claim 1, further comprising:
a secondary housing disposed on the outside of the anchoring arm and adapted to retract into the main housing when the anchoring arm is contracted.

10. The apparatus of claim 1, wherein the chamber comprises an opening adapted to receive a shaft of a piston and wherein the chamber is adapted to stop the motion of the piston when a head of the piston reaches the opening in the chamber.

11. The apparatus of claim 1, wherein the mechanical stop comprises a chamber attached to the upper end segment and a piston disposed partially within the chamber.

12. The apparatus of claim 1, wherein the anchoring arm comprises at least two springs.

13. The apparatus of claim 1, further comprising a sensor.

* * * * *